US005346577A

United States Patent [19]

Johnson et al.

[11] Patent Number: 5,346,577

[45] Date of Patent: Sep. 13, 1994

[54] UNIVERSAL SILK SCREEN COATING MACHINE

[75] Inventors: Roderick D. Johnson, Duluth; Jan N. Heath, Cloquet, both of Minn.

[73] Assignee: The Chromaline Corporation, Duluth, Minn.

[21] Appl. No.: 772,080

[22] Filed: Oct. 7, 1991

Related U.S. Application Data

[62] Division of Ser. No. 591,800, Oct. 2, 1990, Pat. No. 5,093,160.

[51] Int. Cl.[5] .................................... C09J 5/02

[52] U.S. Cl. .................................... 156/308.8; 156/538; 156/552; 156/580; 156/581

[58] Field of Search ................ 427/358, 209; 118/407, 118/413; 156/281, 308.8, 538, 552, 580, 581

[56] References Cited

U.S. PATENT DOCUMENTS 4,599,248 7/1986 Shirataki ............................ 427/209
4,636,758 1/1987 Bloothoofd ......................... 118/412
4,848,268 7/1989 Sollinger et al. ............... 118/119 X

FOREIGN PATENT DOCUMENTS 85101388.8 2/1985 European Pat. Off. .
650898 3/1951 United Kingdom .

OTHER PUBLICATIONS

Harlacher AG "Coating Machine" Brochure (no date).

*Primary Examiner*—Shrive Beck
*Assistant Examiner*—Katherine A. Bareford

[57] ABSTRACT

A universal coating machine includes a frame and means for securing either a holding means for a liquid emulsion or a means for supporting and supplying a film. The securing means is operatively connected to the frame. The securing means is rotatable between a first position and second position. The securing means is biased to return to the first position when the emulsion or film is being applied to the screen.

12 Claims, 7 Drawing Sheets

FIG. 6
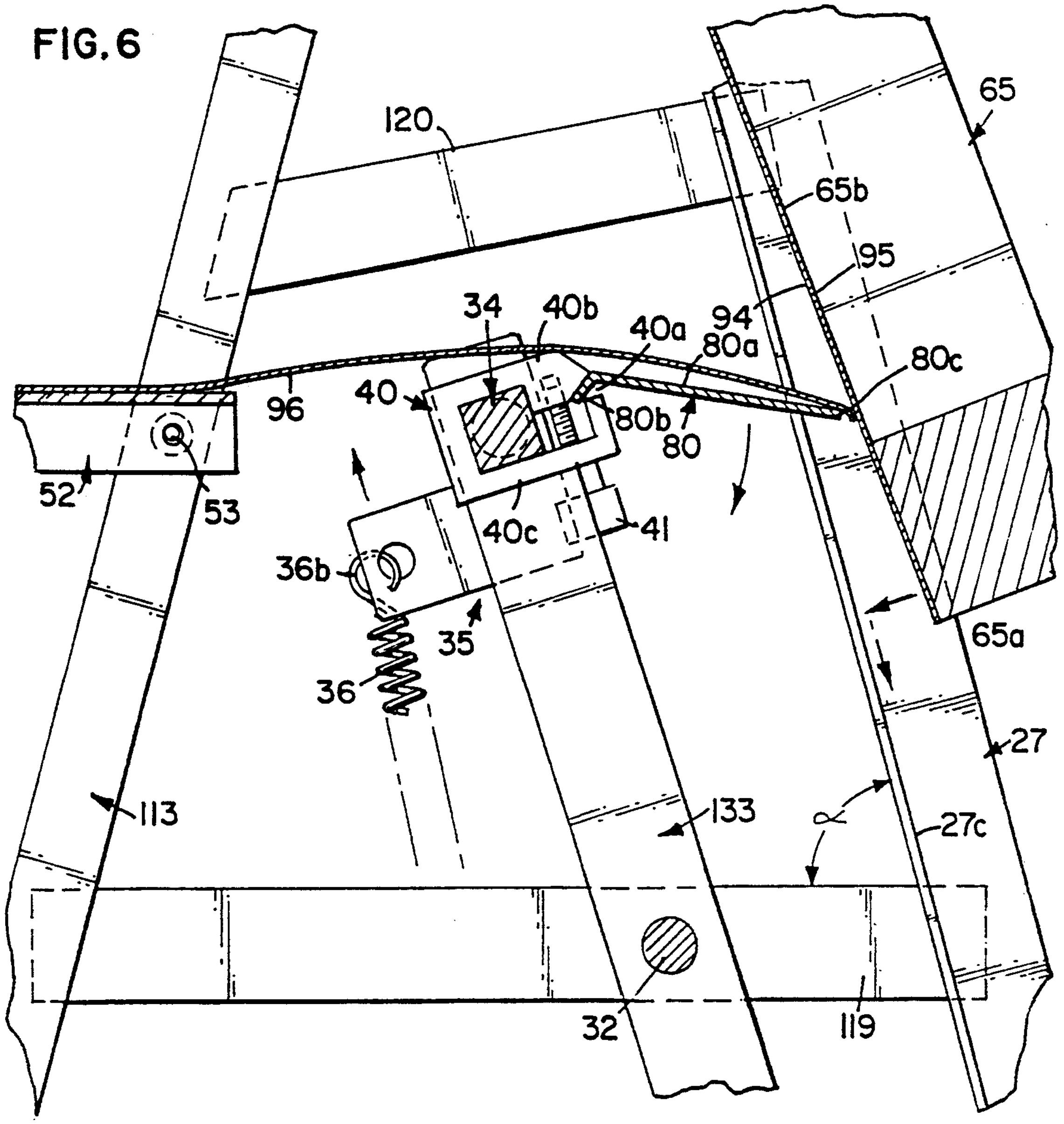
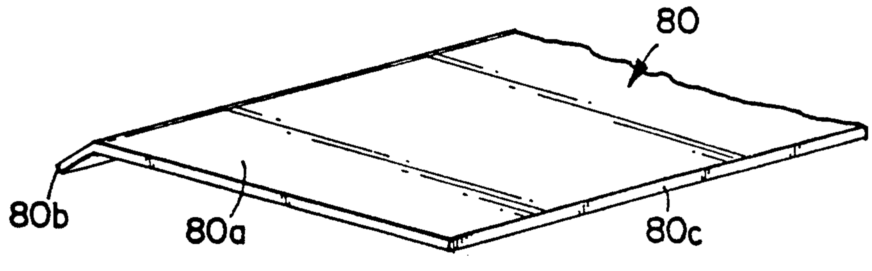
FIG. 7

UNIVERSAL SILK SCREEN COATING MACHINE

This is a division of application Ser. No. 07/591,800, filed Oct. 2, 1990, now U.S. Pat. No. 5,093,160.

BACKGROUND OF THE INVENTION

1. Field of the Invention

This invention relates generally to a coating machine for a silk screen printing operation and more particularly to a machine for coating both a liquid emulsion as well-as capillary film to a screen wherein the scoop or applicator is held relatively stationary and the screen is moved during the application process.

2. Description of the Prior Art

A screen which is used in the silk screen industry has typically from fifty threads to up to four or five hundred threads per inch. This screen then becomes a type of printing plate. Either a liquid or dry emulsion may be applied to the screen. When a liquid emulsion is applied to the screen, this typically is a manual operation and is completed by holding the screen at an angle away from the worker and running a scoop or coater, containing the liquid emulsion, on the screen. This process is quite typically repeated on both sides of the screen. The goal is to obtain a very consistent and smooth coating so that a consistent smooth print image is obtained.

While this appears to be a relatively simple manual operation, there are several drawbacks with this method. After repeated motion, the operators arm becomes fatigued and subject to muscle stress. There is a definite skill in applying the right pressure as well as moving the coater at the correct speed in order to obtain the proper coating thickness. When applying the coating, the operator is moving the coater away from himself and therefore is not in a good position to see the coating which is being applied. Without being able to see the coating, it is difficult to control the coating speed.

Sophisticated mechanized and computer controlled machines are available, such as the H41E from Harlicher Ag in Germany. The machine places the screen in a fixed position and the coating troughs containing the emulsion are moved up the screen on one or both sides. This is typically a very sophisticated piece of equipment, requires much time to set up and is not always economical to purchase when one is producing small lot sizes of screens.

When a dry emulsion, typically applied as a capillary film, is coated on a screen, this can also be done either manually or by means of a sophisticated mechanized computer controlled machine. When done manually, the screen is thoroughly wetted and the capillary film is placed on top of the screen, which is either vertical or at an angle away from the worker. The film and screen are at such an angle that the water, by the force of gravity, tends to be driven away from the film. After the film is applied, the operator may or may not squeegy away excess water. This squeegy action may deform the film.

The present invention addresses the problems associated with the prior and provides both a method and apparatus for applying a liquid emulsion as well as a method and apparatus for applying a dry emulsion. In addition, the invention addresses the problem of having the ability to do both processes without the use of extensive set up time and provides for a universal coating machine for use in applying either a liquid emulsion or a dry emulsion to a screen.

SUMMARY OF THE INVENTION

The present invention is a method of applying a liquid emulsion to a screen by placing a liquid emulsion in a coating trough and placing a screen overlying the coating trough. Force is then applied to the screen in downward direction causing the coating trough to rotate from a first position to a second position, the second position allowing the screen emulsion to flow out of the coating trough on to the screen. The coating trough is maintained in a substantially fixed position and the screen is moved, wherein the emulsion is coated on to the screen.

In another embodiment, the invention is an apparatus for applying a liquid emulsion to a screen, the screen having a frame having a width and threads on one side of the frame. The apparatus includes means for holding a liquid emulsion and means for mounting the holding means and allowing the holding means to rotate between a first position, wherein the liquid emulsion is contained, to a second position, wherein the liquid emulsion may flow out of the holding means. The mounting means maintains the holding means in a substantially fixed position. Means are also provided for supporting and guiding the screen and the screen is moved over the holding means, whereby the liquid emulsion is coated on the threads of the screen.

In another embodiment, the invention is a method of applying a capillary film to a screen by placing a capillary film over a guide plate and placing a screen overlying the plate, wherein the leading edge of the film contacts the lower portion of the screen. Force is applied to the screen in a downward direction, causing the plate to rotate from a first position to a second position, while maintaining the plate in a substantially fixed position. The screen is then moved, wherein the film is applied to the screen.

In another embodiment, the invention is an apparatus for use in applying a film to a screen, the screen having a frame having a width and threads on one side of the frame. The apparatus includes means for holding a film and means for mounting the holding means and allowing the holding means to rotate between a first position to a second position. Means are also provided for supporting the screen as the screen is moved over the holding means whereby the film is applied to the threads of the screen.

In another embodiment, the invention is a universal coating machine for use in applying either a liquid emulsion or a capillary film to a screen. The machine includes a frame and means for securing either a holding means for a liquid emulsion or means for supporting and supplying a film. The securing means is operatively connected to the frame. The securing means is rotatable between a first position and a second position. The securing means is biased to return to said first position when the emulsion or film is being applied to the screen.

BRIEF DESCRIPTION OF THE DRAWINGS

FIG. 6 is a cross-sectional view of a portion of a second embodiment of the present invention showing the apparatus for use with coating capillary films;

FIG. 7 is a partial perspective view of the plate utilized in the apparatus shown in FIG. 6;

DETAILED DESCRIPTION OF THE PREFERRED EMBODIMENT

Figure 1:
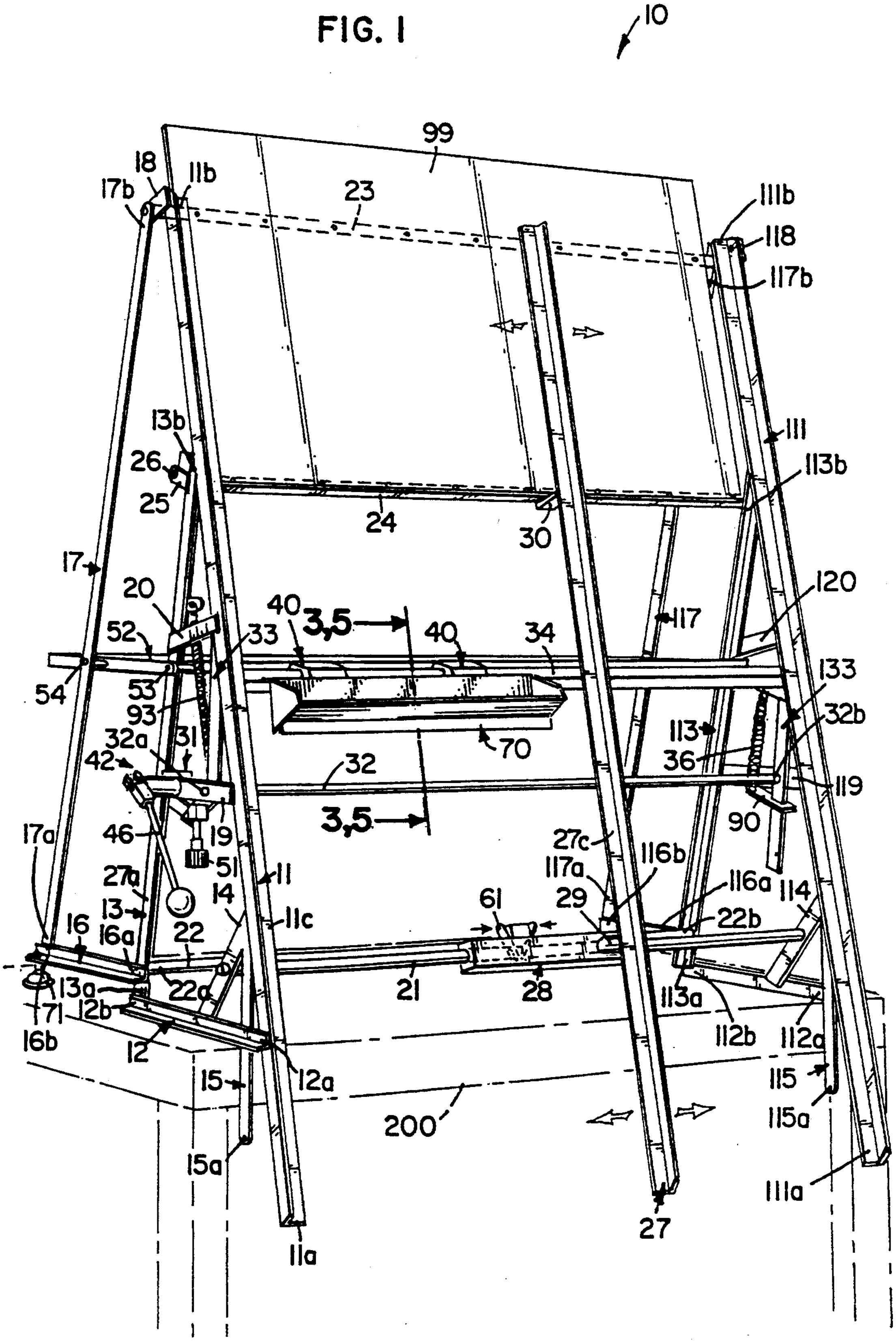
FIG. 1 is a perspective view of a coating machine constructed according to the principles of the present invention.

Referring to the drawings, wherein like numerals represent like parts through the several views, there is generally disclosed at 10 a coating machine. The coating machine 10 has a first side rail 11 having a bottom end 11*a* and a top end 11*b*. Operatively connected, by suitable means such as welding, to the side rail 11 is a first, generally horizontal support 12. The first end 12*a* is operatively connected to the side rail 11 proximate the first end 11*a* but spaced slightly above the bottom end 11*a*. The second end 12*b* of the support 12 is operatively connected to the first end 13*a* of end 13. The second end 13*b* is operatively connected, by suitable means such as welding, to the first side rail 11. A bracket 14 is operatively connected, by suitable means such as welding, at one end to the support 12 proximate its middle and at its other end to the first side rail 11. A guide post 15 is operatively connected at one end to the first side rail 11 proximate where the bracket 14 is attached and the guide post 15 depends generally downward and is generally vertical. Because the first side rail 11 is at an angle to the vertical, the bottom end 15*a* of the guide post 15 is spaced away from the side rail 11.

A back horizontal support 16 is operatively connected at one end to the intermediate support 13 such that its first end 16*a* extends slightly beyond the intermediate support 13. Its second end 16*b* is operatively connected to a first end 17*a* of a brace 17. A cross support 18 has one end operatively connected to the top end 11*b* of the first side rail 11 and its other end to the second end 17*b* of the brace 17. A bottom brace 19 is operatively connected between the side rail 11 and the intermediate support 13. Similarly, a top brace 20 is operatively connected between the side rail 11 and intermediate support 13.

The left frame structure, as viewed in FIG. 1, which has been described in the preceding paragraphs, is a mirror image for the right frame structure. That is the coating machine 10 has a second side rail 111 having a bottom end 111*a* and a top end 111*b*. Operatively connected, by suitable means such as welding, to the side rail 111 is a first, generally horizontal support 112. The first end 112*a* is operatively connected to the side rail 111 proximate the first end 111*a* but spaced slightly above the bottom end 111*a*. The second end 112*b* of the support 112 is operatively connected to the first end 113*a* of end 113. The second end 113*b* is operatively connected, by suitable means such as welding, to the first side rail 111. A bracket 114 is operatively connected, by suitable means such as welding, at one end to the support 112 proximate its middle and at its other end to the second side rail 111. A guide post 115 is cooperatively connected at one end to the first side rail 111 proximate where the bracket 114 is attached and the guide post 115 depends generally downward and is generally vertical. Because the second side rail 11 is at an angle to the vertical, the bottom end 115*a* of the guide post 115 is spaced away from the side rail 111.

A back horizontal support 116 is operatively connected at one end to the intermediate support 113 such that its first end 116*a* extends slightly beyond the intermediate support 113. Its second end 116*b* is operatively connected to a first end 117*a* of a brace 117. A cross support 118 has one end operatively connected to the top end 111*b* of the second side rail 111 and its other end to the second end 117*b* of the brace 117. A bottom brace 119 is operatively connected between the side rail 111 and the intermediate support 113. Similarly, a top brace 120 is operatively connected between the side rail 111 and intermediate support 113. Any suitable connection, such as welding may be utilized to connect the frames. A board or panel 99 is operatively connected to the two frame sections to prevent racking of the entire frame. As shown in FIG. 1, the panel 99 is pinned to the top supporting brace 23 proximate the panel's top. Proximate the panel 99's bottom it is pinned to the intermediate supporting brace 24.

The bottom of the left frame and right frame are operatively connected by means of a circular guide rail adjustment bar 21 and a bottom brace member 22. The bottom brace member has a first end 22*a* operatively connected to the first end 16*a* and a second end 22*b* operatively connected to the first end 116*a* of the back horizontal brace 116. While FIG. 1 shows that the bar 21 is inserted through a hole in the brackets 14 and 114 and then suitable welded, it is understood that any other means of attachment may be utilized to secure the adjustment bar 21 between the brackets 14 and 114.

The top portions of the side rails 11 and 111 are connected by means of a top supporting brace 23 and an intermediate supporting brace 24. The intermediate supporting brace 24 is operatively connected, by suitable means, to the top portion of the intermediate supports 13 and 113 proximate where the intermediate 13 and 113 are secured to the side rails 11 and 111. The intermediate supporting brace may be secured by any suitable means. As shown in FIG. 1, a flange 25 is welded to the intermediate support 13 and a similar flange (not shown) is connected to the intermediate support 113. A bolt 26 is then inserted through a hole in the flange 25 and into an aperture in a side wall of the intermediate supporting brace 24.

The top supporting bar 23 is similarly operatively connected between the ends 17*b* and 117*b* of braces 17 and 117. It is appreciated that one skilled in the art could find many suitable means of operatively connecting all of the components thus far describes. The embodiment detailed above is simply one way of providing a suitable framework for constructing the frame of the coating machine 10. It can be seen that the frame of the coating machine 10 is suitable for use on top of a bench 200. An adjustable foot 71 is connected to the second end 16*b*. Another adjustable foot (not shown) is connected to support 116. The feet are used to align the machine 10 on the bench 200 in alignment with supports 12 and 112. The guide posts 15 and 115 are used to hold the rails 11 and 27 away from the bench 200 so that the operator does not hit his hands when moving the screen down the rails 11 and 27. It is also understood that the frame may be modified, by one skilled in the art, to be free standing.

Figure 8:
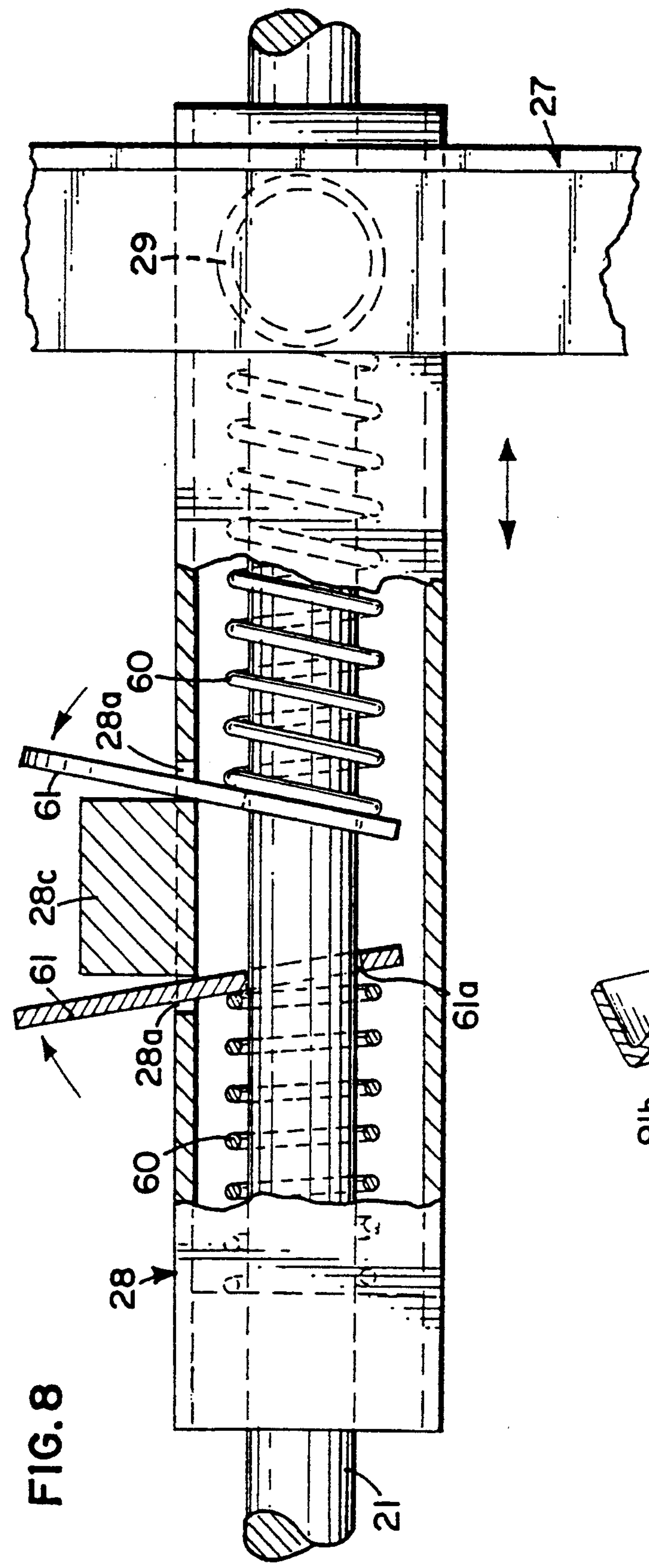
FIG. 8 is an enlarged front elevational view of the adjustment block shown in FIG. 1.

Means are provided for operatively connecting an adjustable guide rail 27 to the coating machine 10. The guide rail 27 is mounted parallel to the side rail 11. Both the side rail 11 and the guide rail 27 are constructed from one inch angle iron. As will be discussed more fully hereinafter the 90° angles formed by the side rail 11 guide rail 27 allow for the guided movement of a silk screen frame 65. It is preferred for the adjustable guide rail 27 to be mounted to the coating machine in such a manner that the distance between the side rail 11 and adjusting rail 27 may be changed. As will be discussed hereinafter, this will allow for different sized frames 65 to be processed. One means of providing an adjustment between the side rail 11 and guide rail 27 is by means of a block 28. The block 28 has a cylindrical bore through its length which is larger than the diameter of the circular guide rail adjustment bar 21. As more clearly seen in FIG. 8, the block 28 has a bore which allows the bar 21 to pass therethrough. Two slots 28a are provided in the top of the block 28. Through the slots 28 are inserted two tabs 61. Each of the tabs have an opening 61a which is slightly larger than the bar 21. Springs 60 are positioned in the cavity of the block 28 and force the tabs inward. As shown in FIG. 8, the springs are forcing the tabs 61 to a position wherein the bar 21 is locked in place. When the tabs 61 are rotated inward toward each other, a block 28c prevents their further movement inward. However, when they are in a generally vertical arrangement, the apertures 61a are also vertical and the block 28 is then able to be slid on top of the bar 21.

A standoff 29 is operatively connected at one end to the block 28 and at its other end to the underside of the adjusting guide rail 27. This may be done by any suitable means such as welding. The standoff 29 is of such a length that the first surfaces 11c and 27c are in the same plane. To stabilize the top portion of the guide rail 27, a clip 30 may be connected at a position just below the intermediate supporting bar 24. The clip 30 would then go underneath the bar 24 and then up the back side of the bar 24 to more fully support the guide rail 27. It is understood that any other suitable adjusting mechanism may be used to vary the distance between the side rail 11 and guide rail 27.

A universal applicator mechanism, generally designated as 31, is provided to support either a means for supplying liquid emulsion or a means for supplying a dry emulsion. The mechanism 31 is pivotally mounted at its base between bottom cross braces 19 and 119 and is free to rotate at its top end.

The mechanism 31 includes a crossbar 32 which is positioned between the cross braces 19 and 119. The crossbar 32 has a first end 32a which is insertable in a hole in the crossbar 19 and a second end 32b which is inserted in a hole in the crossbar 119. The bar 32 is free to rotate in the holes provided in braces 19 and 119. The first end 32a and second end 32b become pivot points for the mechanism 31. The support structure for the coating trough 70 or plate 80 includes a first upright 33 and a second upright 133 operatively connected to the crossbar 32. The uprights are secured such that when the uprights 33 and 133 rotate, the bar 32 also rotates with the uprights 33 and 133. The top ends of the uprights 33 and 133 are operatively connected to a rectangular support bar 34. A circular rod is operatively connected, such as by welding, to end of the support bar 34. Therefore, a cylindrical rod 34a is mounted in an aperture in upright 33 and a cylindrical rod 34b is mounted in the upright 133 and the rod 34 may rotate in the apertures in the uprights 33 and 133.

Figure 2:
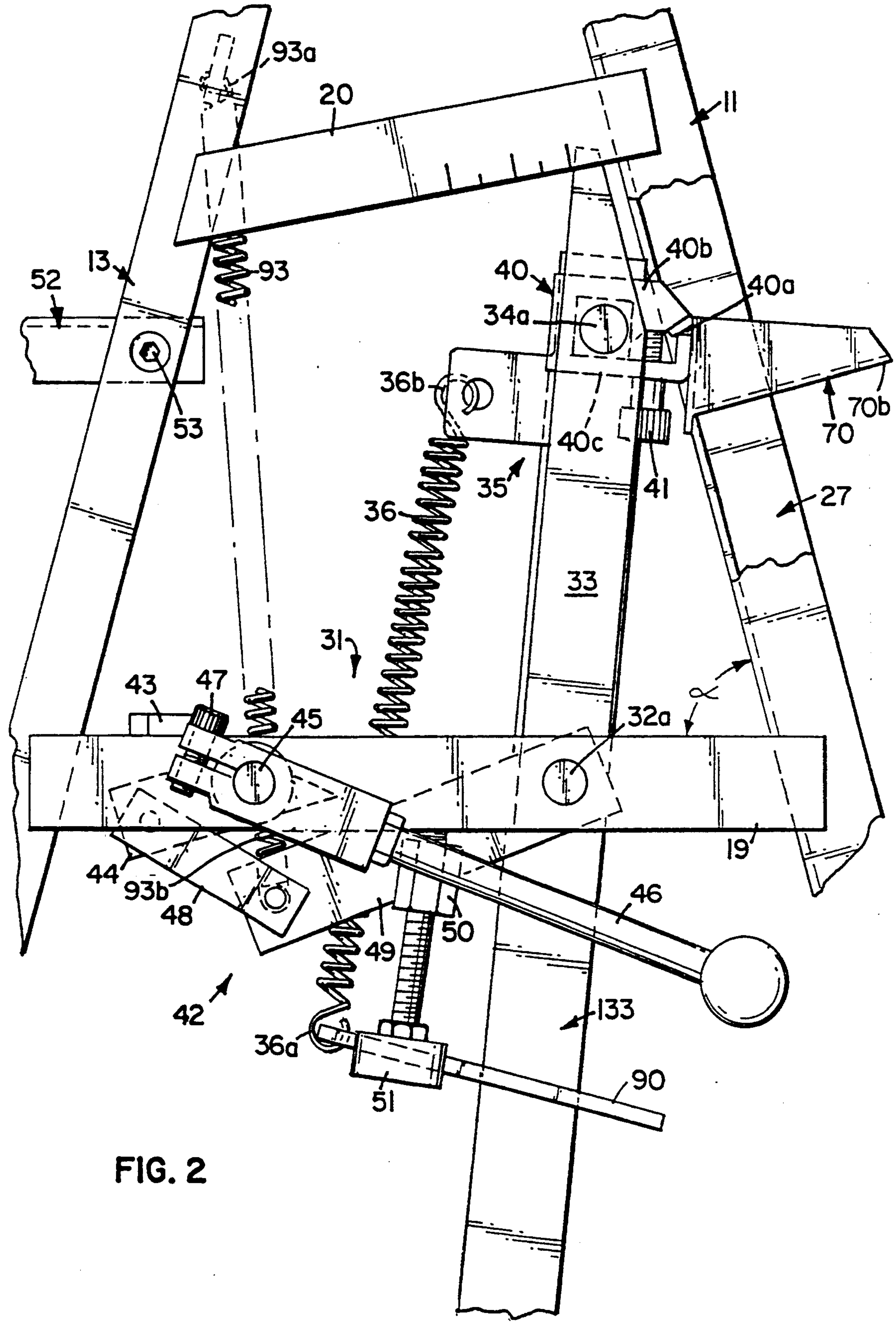
FIG. 2 is a side elevational view of a portion of the apparatus shown in FIG. 1 showing the coater in a first position, the lever system in a down position.
Figure 3:
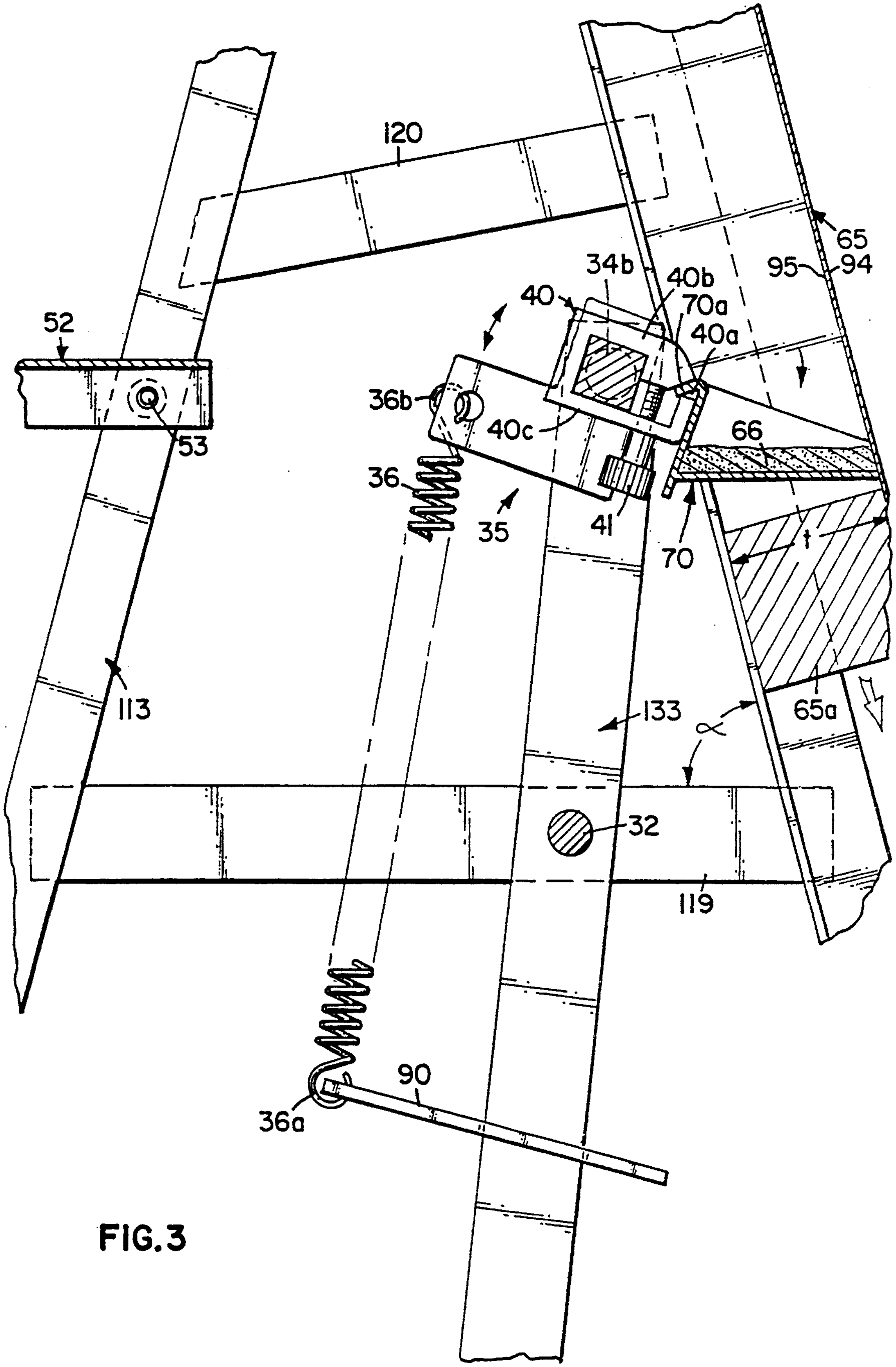
FIG. 3 is a cross-sectional view taken generally along the lines 3—3 of the apparatus shown in FIG. 1 showing the coating trough in a second or coating position, the lever system in a down position.
Figure 4:
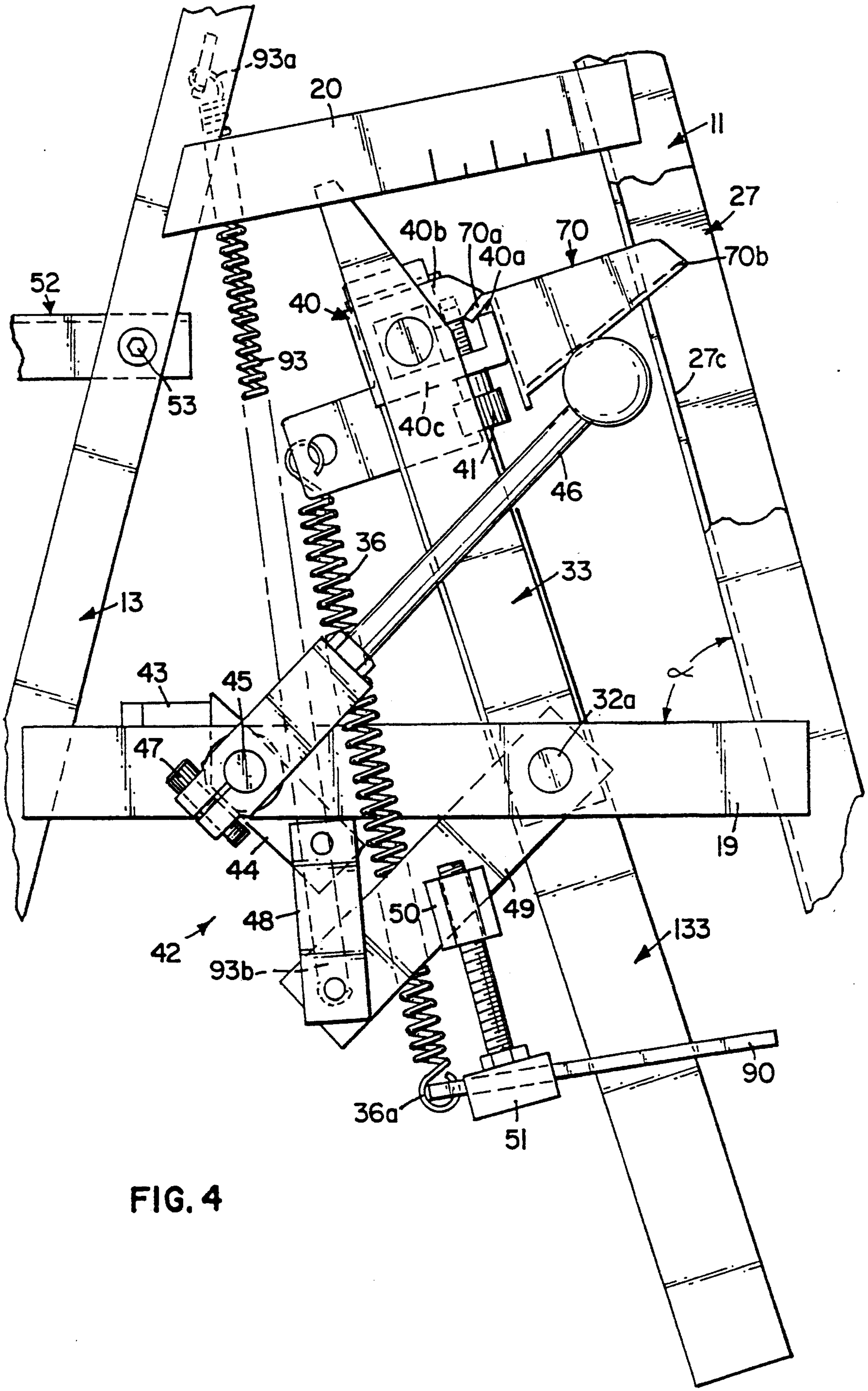
FIG. 4 is a side elevational view of a portion of the apparatus shown in FIG. 1, showing the coating trough in a first position, the lever system in an up position.
Figure 5:
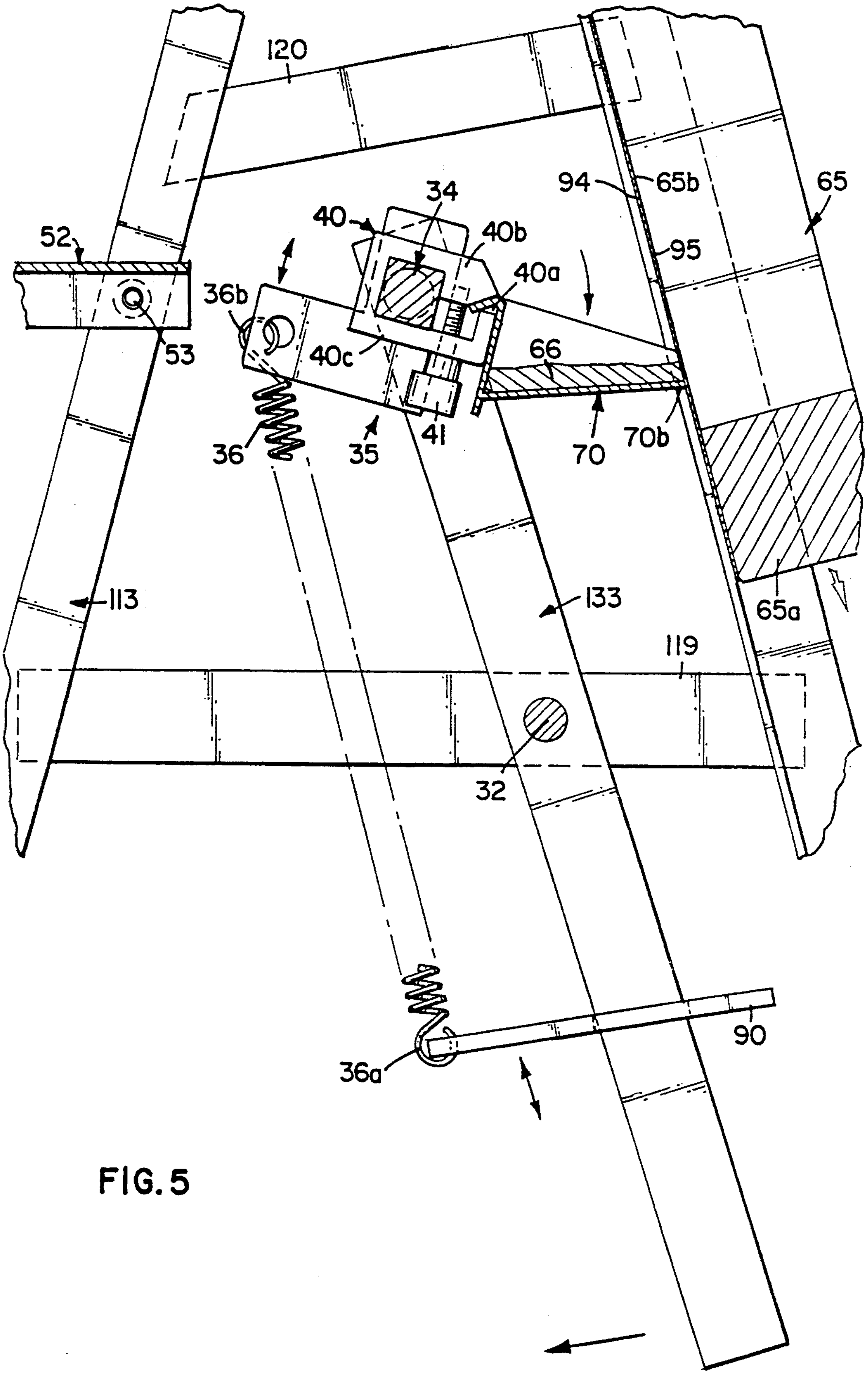
FIG. 5 is a cross-sectional view taken generally along the lines 5—5, showing the coating trough in a second or coating position, the lever system in a down position.
Figure 9:
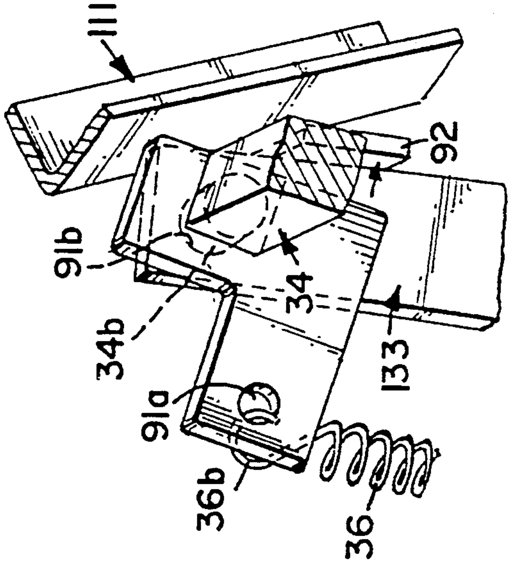
FIG. 9 is an enlarged perspective view showing a portion of the spring adjusting mechanism shown in FIG. 1.

A spring mechanism 35 is provided to provide a rotational force on the bar 34 such that the bar 34 tends to be rotated in a counterclockwise direction. The amount of force may be adjusted by varying the tension on the spring 36. As best seen in FIGS. 3, 5 and 9, a spring 36 has a first end 36a operatively connected to a slide plate 90. As shown in FIG. 3, this connection is by way of inserting the end 36a through an aperture in the slide plate 90. The slide plate 90, as shown in FIG. 1, has an opening sized slightly larger than the upright 133 through which the upright 133 is positioned. The second end of the spring 36b is operatively connected to an L-shaped bracket 91 and is simply connected by inserting the end 36b through an aperture 91a in the bracket 91. The aperture 91a is positioned in one leg of the bracket and a second opening 91b is formed in the other leg of the bracket. This allows the bracket 91 to be mounted to the cylindrical rod 34b. The bracket 91 is operatively connected to the rod 34b by any suitable means, such as welding. Therefore, the force of the spring is transmitted to the support bar 34 and tends to cause rotation in a counterclockwise direction. As shown in FIG. 9, the coater 70 or plate 80 would have to be forced in a downward position in order to overcome the tension of the spring 36. A stop plate 92 is welded to the upright 133 in such a position to prevent the rotation of the bracket 91 and therefore bar 34 past a set position. This position would be that shown in FIGS. 2 and 4. The tension of the spring may easily be adjusted by pulling down on the first end of the spring 36a which would then align the opening in the slide plate 90 with the upright 133 and allows the plate 90 to be brought either down or up. This would either increase or decrease the tension of the spring 36. Then, when the spring end 36a is released, the tension of the spring would cause the slide plate 90 to rotate slightly upward, as shown in FIGS. 3 and 5, and lock the slide plate in position.

Means for mounting the coater 70 or plate 80 are provided by clamps 40. The clamps 40, as best seen in FIGS. 2 and 4, surround the bar 34 and have an opening 40a into which either the coater 70 or plate 80 may be inserted. The top portion 40b has a threaded portion through which a bolt 41 may be inserted. The bolt 41 is inserted through the bottom section 40c and the threads of the bolt 41 engage the threaded portion in the top 40b. When the bolt just begins engagement Of the threads, the inner cavity of the clamp 40 clears the bar sufficiently such that the clamps 40 may easily be slid back and forth along the rod 34. When the bolt 41 is tightened, the top portion 40b is brought proximate the bottom portion 40c and the clamp 40 is secured around the bar 34. Upon further tightening of the bolt 41, the opening 40a further decreases and the coating trough 70 or plate 80 is firmly secured to the clamps 40.

A lever system, generally designated as 42, is provided to position the coating trough 70 or the plate 80 in the proper position during use. The lever system 42 is shown in a first or up position, in FIG. 4 and in a second or down position, in FIG. 2. As will be more fully described hereafter, the lever system 42 is in a first position when coating one side of the mesh **65*b* and is in a second position when coating the other side of the mesh 65*b*. As will be more fully discussed hereafter, the lever system 42 allows for compensation for the thickness of the frame 65*a*. Using brace 19 as a reference point and inside referring to toward the middle of the machine 10, a stop block 43 is operatively connected, by suitable means such as welding, to the inside surface of brace 19. A first arm 44 is mounted on a shaft 45, such that rotation of the shaft 45 causes rotation of the first arm 44. The shaft 45 is operatively connected to a lever arm 46 by means of a bolt 47 which squeezes together two portions of the lever arm 46 around the shaft 45. The shaft 45 has a first end which would be used for connection to the lever 46 and a second end which would be inserted through the brace 19 and secured to the first arm 44. A central portion of the shaft is enlarged, as best shown in FIG. 1. The lever arm 46 is generally perpendicular to the shaft 45. The first arm 44 is pivotally connected to a second arm 48 which is in turn pivotally connected to a third arm 49. The third arm 49 is connected to the first end 32*a* of crossbar 32 such that rotation of the third arm 49 causes the crossbar 32 to rotate. A threaded block 50 is welded to the third arm 49 such that a bolt 51 may be inserted into the block 50. The block 50 is positioned such that the bolt 51 is in alignment with the underneath side of the brace 19. A spring 93 has a first end 93*a* which is inserted through an opening in the support 13. Similarly, the second end 93*b* is connected to the pivot point between the second arm 48 and third arm 49. The spring 93 provides tension on the lever assembly 42 to hold the lever system in position. A film tray 52 is supported between the intermediate supports 13 and 113 and braces 17 and 117, by any suitable means. The tray 52 runs the entire width of the machine 10. As shown in the figures, the tray 52 is supported by means of rods 53 and 54 which are secured to the supports 13 and 113 and braces 17 and 117**. It is of course understood that any suitable means of attachment may be utilized and would be well known by one skilled in the art.

As will be described hereafter, the coating machine 10 may be utilized with either a liquid emulsion or a dry emulsion (capillary film). Operation of the coating machine 10 will be first described with respect to a liquid emulsion. The screen 65 on which the liquid emulsion 66 will be coated has a frame **65*a* and the frame has a thickness t. The screen 65 has a mesh 65*b*. The liquid emulsion 66 is typically coated on both sides of the mesh 65*b*. The first side of the mesh will be referred to as 94 and the second side 95. Since the mesh 65*b* is not in the middle of the frame, but on one side, as the frame is being pushed down and into the rails 11 and 27, the distance from the mesh to the guide rails will vary depending upon the side of the mesh being coated. As will be described hereafter, the lever system 42 accommodates for this difference and allows for both sides of the mesh 65*b* to be coated with a simple adjustment of the lever system 42 by means of rotation of the lever arm 46. Initially, the operator selects the screen 65 to be coated and adjusts the distance between the guide rail 27 and side rail 11 depending upon the width of the screen. In order to adjust the width between the guide rail 27 and side rail 11, it is simply necessary to pinch together the tabs 61 which allow the block 28 to slide freely along the bar 21. As the block 28 is moved, the standoff 29, which is secured to the block 28, is carried with the block 28 and thereby moves the guide rail 27. The distance between the side rail 11 and guide rail 27 should roughly correspond to the width of the screen 65. However, it is understood that it is best to leave a small amount of space so that the frame does not bind as it is moved down the rails 11 and 27. The liquid emulsion 66 is then placed in the coating trough 70. The coating trough 70 is of a type well known in the art and may be a coater which is typically used in a hand operation. The coating trough 70 has a tab 70*a* which is clamped by the clamps 40. It has been found that it is best to have the clamps 40 evenly spaced. The spring tension of spring 36** is then adjusted to allow for the desired amount of tension.

Because the frame **65*a* has a thickness t, the mesh 65*b*, which is on one side of the frame, will be in a different position depending upon what side of the mesh is to be coated. FIGS. 4 and 5 show a first side 94 of the mesh 65*b* being coated and FIGS. 2 and 3 show a second side 95 being coated. Referring to FIG. 2, the coating machine 10 is designed such that when the first side 94 of the mesh 65*b* is to be coated, the first arm 44 abuts the stop 43. This allows the bottom edge 70*b* of the coating trough 70 to extend approximately one half inch past the surfaces 11*c* and 27*c*. The coating trough 70 is now in a position, as shown in FIG. 4, such that the liquid emulsion would not flow out of the top of the coating trough 70. Then the top and bottom of the frame 65*a* is grasped and the top of the screen is placed into the rails 11 and 27 and the bottom of the mesh 94 makes contact with the bottom 70*b* of the coating trough 70, as shown in FIG. 5. The frame is pushed down into the rails 11 and 27 until it is flush against the rail surfaces 11*c* and 27*c*. The coating trough will rotate about the cylindrical rod 34*b* as the frame is pushed inward, thereby tilting until a line of emulsion 66 will form on the bottom of the mesh. Maintaining even pressure, the screen 65 is pulled downward along the rails 11 and 27**, allowing emulsion to flow on to the mesh and coat. As the coating trough approaches the top of the screen, pressure is slowing released, allowing the coating trough to tip back up and rotate back to its first position, which will wipe the top edge of the mesh.

The lever 46 is now moved to the position shown in FIG. 2. The position to which the lever moves is dependent upon where the bolt 51 has been adjusted. Prior to the coating of the first surface, the bolt 51 should be adjusted to allow for the proper thickness t of the frame. A gauge is placed across the bar 20 to allow for easy adjustment. The bolt 51 is simply rotated, causing movement of the lever system 42 and thereby rotation of the upright 33. This rotation moves the coating trough 70 the proper distance so that the mesh may be coated on the second side, as shown in FIG. 3. The lever system 42 would be adjusted such that the bottom **70*b* of the coating trough 70 would extend approximately one half inch beyond the mesh 65*b* when the screen 65 is placed on the rails 11 and 27. Of course, the bottom 70*b* of the coating trough does not extend beyond the edge of the mesh in operation but it is this one half inch extension which forces the coating trough 70 to rotate once the screen 65 is placed in position and forced down into the coating trough. The coating process of the second side 95** is then repeated as previously described. If the operator then wishes to coat the first side of the screen again, the process may simply be continued.

In addition to being able to coat wet emulsions, the coating machine 10 may also be utilized in applying capillary films. When capillary films 96 are to be applied, the coating trough 70 is replaced by a plate 80. The plate 80 is simply an elongate plate having a flat top planar surface 80*a* and a tab 80*b*. The tab 80*b* is similar to the tab 70*a* and is designed to be secured in the clamps 40.

Again, the lever system 42 is initially set up so that the leading edge 80*c* of the plate 80 is approximately one half inch beyond the surfaces 17*c* and 27*c*. The plate 80 has a width which is preferably one to two inches wider than the width of the film 96. The trailing portion of the film 96 is supported by the film tray 52 and the leading portion of the film 96, just prior to being applied, is supported by the plate 80. The tension in the spring 36 is adjusted to a light pressure setting as film application requires minimal coating pressure. The film 96 is centered on the plate 80 and approximately one half inch of the film extends over the leading edge 80*c* of the plate 80 to assure contact with the first side 94 of the mesh 65*b*. The mesh is then thoroughly wet and the method is then quite similar to that previously described for the liquid emulsion. That is, the top edge of the frame 65*a* is set into the rails 11 and 27 and the bottom portion of the mesh 65*b* to be coated is brought in contact with the leading edge of the film 96. The frame 65 is then pushed down into the rails 11 and 27 which would rotate the plate 80 downward as shown in FIG. 6. The frame is then pulled down the rails 11 and 27 and the film 96 is coated on to the mesh 65*b*. The plate 80 provides a squeegy like action and assures good film adhesion. The squeegy like action is provided by the bias urging the plate 80 back to its first position. Consistent tension is maintained agains the mesh 65*b* by the leading edge 80*c* to obtain a good squeegy action. If blisters or bubbles should appear, they can be fixed by a spritz of water on the squeegy side of the mesh. One of the advantages of this method is that the water which has been utilized to wet the mesh 65*b* tends to run through the mesh, by gravity, to the side on which the film is being coated. This, along with the squeegy like action while being applied, provides for a better adhesion of the film 96 to the mesh 65*b*.

Referring back again to the coating of the liquid emulsion, as the emulsion is being applied to the mesh 65*b*, the operator has the ability to see better how the coating action is proceeding and is able to adjust the coating speed, i.e., the speed at which the frame is brought down the rails, to obtain a better coating. For both the liquid and the film coating methods, the screen and not the coating trough or plate is moved. This provides for the ability to apply pressure through the spring 36 and on the operator does not have to use his hand to apply the pressure. The mesh 65*b* is in a position between the operator and the coating trough.

With respect to the film coating, pressure is applied to the film at the same it touches the water and the mesh 65*b*. The squeegy like action of the plate 80 tends to build up a bead of water in the area between the film and the mesh and thereby enhances good adhesion as the frame and mesh is brought down the rails.

In liquid emulsion coating by hand, the operator tends to have the frame at an angle toward the operator. The present invention orients the screen 65 at an angle away from the operator and the operator is able to utilize the weight of the screen 65 as well as the tension of the spring 36 to provide the force to coat the wet emulsion 66 on to the mesh 65*b*. Applicants have found that this angle $\alpha$ is between 0 and 30°, preferably between 10 to 20° and prefer between 12½ to 17½°. If the angle begins to exceed approximately 30°, it has been found that it is difficult to completely empty the coating trough 70. If the angle was greater than 30°, there would be less effort for the human operator, as the weight of the frame could be utilized in applying the downward force against the coating trough 70. However, it has been found impractical to find a coating trough 70 which can be adequately dumped when the angle exceeds 30°. In applying film, it is possible to have the angle increased to up to 45°. However, once the angle begins to exceed 45°, the water which has been sprayed on the mesh begins to drip off of the mesh and not roll down into the intersection between the plate 80 and the film 96. The water tends to drip off of the mesh and on to the film. While one could put a plate or cover in between the mesh and the film 96 to prevent this dripping, this would not take advantage of the design which allows the water to bead up in front of the plate 80 and the film 96.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as presented herein. All alternative modifications and variations of the present invention which follow in the spirit and broad scope of the appended claims are included.

We claim:

1. A method of applying a film to a screen, comprising:

(a) placing a film over a rotatable guide plate;

(b) wetting a screen to ensure adhesion of the film to the screen and placing the screen overlying the plate, whereby a leading edge of the film contacts a lower portion of the screen;

(c) applying force to the screen in a downward direction causing the plate to rotate from a first position to a second position;

(d) maintaining the plate in a substantially fixed position; and (e) moving the screen, wherein the film is applied to the screen.

2. The method of claim 1, further comprising positioning the screen between the plate and a person holding the screen.

3. The method of claim 2, further comprising positioning and holding the screen at a given angle while moving the screen, the given angle being 0° to 30°, the angle being measured from vertical and away from the holder.

4. The method of claim 3, wherein the angle is from 10° to 20°.

5. The method of claim 2, wherein the angle is from 12½° to 17½°.

6. The method of claim 1, further comprising applying a force to the plate while in the second position, whereby the plate is urged toward the first position, but is held in the second position by the screen.

7. An apparatus for use in applying a film to a screen, the screen having a frame having a width and threads on one side of the frame, comprising:

(a) means for supporting and applying a film;

(b) means for mounting said support means and allowing said support means to rotate between a first position to a second position when in said second position, said supporting means being biased to return to said first position;

(c) means for supporting and guiding the screen as the screen is moved over said supporting means whereby the film is applied on the threads of the screen when the supporting means is in the second position.

8. The apparatus of claim 7, wherein said mounting and supporting means comprises:

(a) a support frame having a generally horizontal bar, said bar being able to rotate along a horizontal axis;

(b) a clamp slidably mounted on said bar, said clamp for securing said supporting means to said bar;

(c) an adjustable spring means for providing a rotational force to said bar to bias said bar in a first direction; and (d) a stop operatively connected to said bar to limit rotational movement in the direction of the bias.

9. The apparatus of claim 8, further comprising means for allowing said bar to move between a first location to a second location, wherein said holding means is positioned in different locations depending on the position of the screen.

10. The apparatus of claim 7, wherein said supporting and guide means comprises a first 90° angle iron and a second 90° angle iron.

11. The apparatus of claim 10, further comprising means to vary the distance between said first and second angle irons.

12. The apparatus of claim 10, means for allowing movement between locations comprises a lever system operatively connected to said support frame, wherein said support frame is moved between two locations as the lever system is moved between a first location and a second location.

* * * * *